T861013

DEFENSIVE PUBLICATION

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED APRIL 8, 1969

861 O.G. 367

646,764

ADAMANTANE DERIVATIVES

Heinz Fritz Reinhardt, Claymont, Del., assignor to E. I. du Pont de Nemours and Company, Wilmington, Del., a corporation of Delaware

Original application Mar. 14, 1963, Ser. No. 265,062. Divided and this application Feb. 8, 1967. Published Apr. 8, 1969

Class 260—514

No Drawing. 37 Pages Specification

A new class of chemical compounds having the formula: R—A—$(X)_m$—A—R′ in which A is a 1,3-adamantylene group (a 1,3-radical of adamantane(tricyclo [3.3.1.1$^{3,7}$]decane)) which has the formula

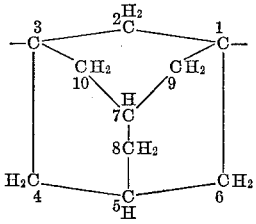

and X, R and R′ are substituents capable of combining with a tertiary alkyl carbon atoms (i.e., t-butyl radical) to form stable compounds, X being a divalent radical, R and R′ may be the same or different and may be hydrogen or a monovalent radical, *m* is an integer equal to 0 or 1, and at least one of R and R′ has a molecular weight greater than six when *m* is zero are provided for use in forming various polymers.

In general, R and R′ are any functional group conventionally useful for preparing polymers or any group capable of forming a derivative of a hydrocarbon.

When *m* in the above structural formula is zero, the compounds are 3,3′-derivatives of -1,1′-biadamantane and are particularly useful for forming polymers with unusually high melting points and exceptional stability.

The monomeric acid compound 3,3′-dicarboxy-1,1′-biadamantane is particularly useful in forming highly stable polymers.